United States Patent
Powell

(10) Patent No.: US 10,514,744 B2
(45) Date of Patent: Dec. 24, 2019

(54) PORTABLE COMPUTING DEVICE WITH HIBERNATE MODE

(71) Applicant: The Code Corporation, Draper, UT (US)

(72) Inventor: George Powell, Draper, UT (US)

(73) Assignee: THE CODE CORPORATION, Draper, UT (US)

(*) Notice: Subject to any disclaimer, the term of this patent is extended or adjusted under 35 U.S.C. 154(b) by 0 days.

(21) Appl. No.: 14/939,594

(22) Filed: Nov. 12, 2015

(65) Prior Publication Data
US 2017/0045926 A1    Feb. 16, 2017

Related U.S. Application Data

(60) Provisional application No. 62/205,734, filed on Aug. 16, 2015.

(51) Int. Cl.
| | |
|---|---|
| G06F 1/32 | (2019.01) |
| G06F 1/26 | (2006.01) |
| G06F 1/3206 | (2019.01) |
| G06F 1/3296 | (2019.01) |
| G06F 1/3287 | (2019.01) |
| G06F 1/16 | (2006.01) |
| H02J 7/00 | (2006.01) |
| H01M 2/10 | (2006.01) |

(52) U.S. Cl.
CPC .......... *G06F 1/3206* (2013.01); *G06F 1/1635* (2013.01); *G06F 1/263* (2013.01); *G06F 1/3287* (2013.01); *G06F 1/3296* (2013.01); *H01M 2/1022* (2013.01); *H02J 7/0045* (2013.01)

(58) Field of Classification Search
CPC ...... G06F 1/3206; G06F 1/263; G06F 1/3287; G06F 1/3296
See application file for complete search history.

(56) References Cited

U.S. PATENT DOCUMENTS

| | | | | |
|---|---|---|---|---|
| 5,028,806 A | * | 7/1991 | Stewart | G06F 1/1635 307/66 |
| 5,267,178 A | * | 11/1993 | Berner | G01J 3/02 235/462.15 |
| 5,428,252 A | * | 6/1995 | Walker | G06F 1/30 307/64 |

(Continued)

OTHER PUBLICATIONS

NPL 1, "Hibernation (computing)", Wikipedia, pp. 1-5 (Year: 2010).*

*Primary Examiner* — Stefan Stoynov
(74) *Attorney, Agent, or Firm* — Timothy P. O'Hagan; Ray Quinney & Nebeker

(57) ABSTRACT

A portable computing device is disclosed. The portable computing device includes a processor, a removable battery pack, a battery detection unit, and an internal power-supplying unit. The battery detection unit detects removal of the battery pack from the portable computing device. The internal power-supplying unit provides operating power to the portable computing device after the battery pack is removed from the portable computing device. The battery detection unit may generate an interrupt signal to the processor upon detection of removal of the battery pack such that the processor may begin executing a hibernation routine. The internal power-supplying unit may be a super capacitor or an internal battery.

19 Claims, 4 Drawing Sheets

(56) References Cited

U.S. PATENT DOCUMENTS 5,519,871 A * 5/1996 Shimoda .................. G06F 1/30
                                                    713/300
5,832,282 A * 11/1998 Pate ....................... G06F 1/263
                                                     307/66
9,378,095 B2 * 6/2016 Zhang ..................... G06F 1/30

* cited by examiner

PORTABLE COMPUTING DEVICE WITH HIBERNATE MODE

CLAIM OF PRIORITY

This application claims priority to U.S. Provisional Patent Application No. 62/205,734, titled "Portable Computing Device With Hibernate Mode," filed Aug. 16, 2015, with inventor George Powell, which is incorporated herein by reference as if fully set forth.

FIELD OF INVENTION

The present application generally relates to a portable battery-operated computing device. More particularly, the present application relates to a portable battery-operated computing device having an internal power-supplying unit for supplying power when a battery pack is removed from the portable computing device.

BACKGROUND

Smartphones and other types of portable, hand-held computing devices, such as tablet computers, are in widespread use today, most often in connection with entertainment, communications, and office productivity. The portable computing devices are typically powered by a battery. The battery has a limited capacity and therefore should be recharged or replaced after a certain period of usage. When the battery is removed from the portable computing device, all power is lost and a re-boot is required upon reinstalling a new or recharged battery and powering up the portable computing device. The rebooting process is time-consuming and may cause an interruption of services or loss of data.

SUMMARY

In accordance with one embodiment, a portable computing device is provided. The portable computing device may include a non-volatile memory, a processor, a removable battery pack, a battery detection unit, and/or an internal power-supplying unit. The battery pack provides operating power to the portable computing device including the non-volatile memory and the processor. The battery detection unit detects removal of the battery pack from the portable computing device. The internal power-supplying unit provides power to the portable computing device after the battery pack is removed from the portable computing device.

The battery detection unit may be configured to generate an interrupt signal to the processor upon detection of removal of the battery pack such that the processor begins executing a hibernation routine. Executing the hibernation routine may include turning off at least one peripheral device of the portable computing device, saving settings of the processor to the non-volatile memory, and/or saving a volatile memory state to the non-volatile memory.

The internal power-supplying unit may be a super capacitor or an internal battery. The internal power-supplying unit may be charged by the battery pack when the battery pack is coupled to the portable computing device.

The battery detection unit may be configured to detect removal of the battery pack by detecting a change in position of a mechanical switch that is activated upon removal of the battery pack from the portable computing device. Alternatively, the battery detection unit may be configured to detect removal of the battery pack by detecting a drop in voltage across contacts at which the battery pack connects to the portable computing device.

The portable computing device may be a mobile telephone or a tablet computing device.

In accordance with another embodiment, a method for operating a portable computing device is provided. The method includes detecting removal of a battery pack from a portable computing device, sending an interrupt signal to a processor of the portable computing device upon detection of removal of the battery pack, and executing a hibernation routine in response to the interrupt signal, wherein operating power of the portable computing device is provided by an internal power-supplying unit after removal of the battery pack.

In accordance with another embodiment, a portable computing device is provided. The portable computing device may include a battery for providing operating power for the portable computing device, a battery detection unit for detecting removal of the battery from the portable computing device, a processing unit configured to execute a hibernation routine on a condition that the battery is removed from the portable computing device, and/or an internal power-supplying unit for providing power to the portable computing device after the battery is removed from the portable computing device.

In accordance with another embodiment, a non-transitory computer-readable medium is provided. The non-transitory computer-readable medium may include code for detecting removal of a battery pack from a portable computing device, code for sending an interrupt signal to a processor of the portable computing device upon detection of removal of the battery pack, and/or code for executing a hibernation routine in response to the interrupt signal, wherein operating power of the portable computing device is provided by an internal power-supplying unit after removal of the battery pack.

DETAILED DESCRIPTION

Figure 1:
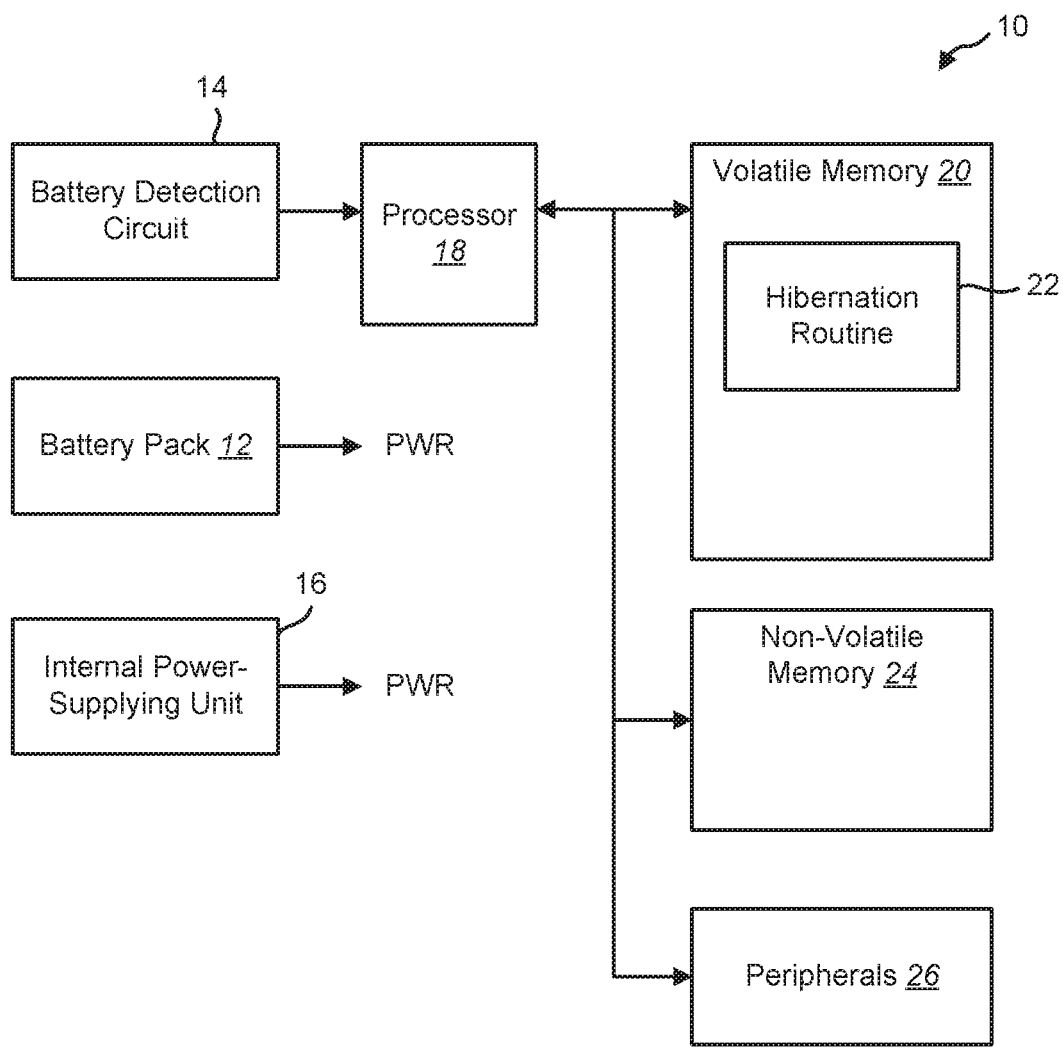
FIG. 1 is a block diagram of an exemplary portable computing device 10 in accordance with one embodiment.

FIG. 1 is a block diagram of an exemplary portable computing device 10 in accordance with one embodiment. The portable computing device 10 may be a mobile phone, a smart phone, a tablet computer, a personal digital assistant (PDA), a notebook computer, or any other type of portable battery-operated computing device, and may include an integrated barcode reading module. The portable computing device 10 may include a processor 18, a volatile memory 20, a non-volatile memory 24, and/or peripheral devices 26.

Figure 4:
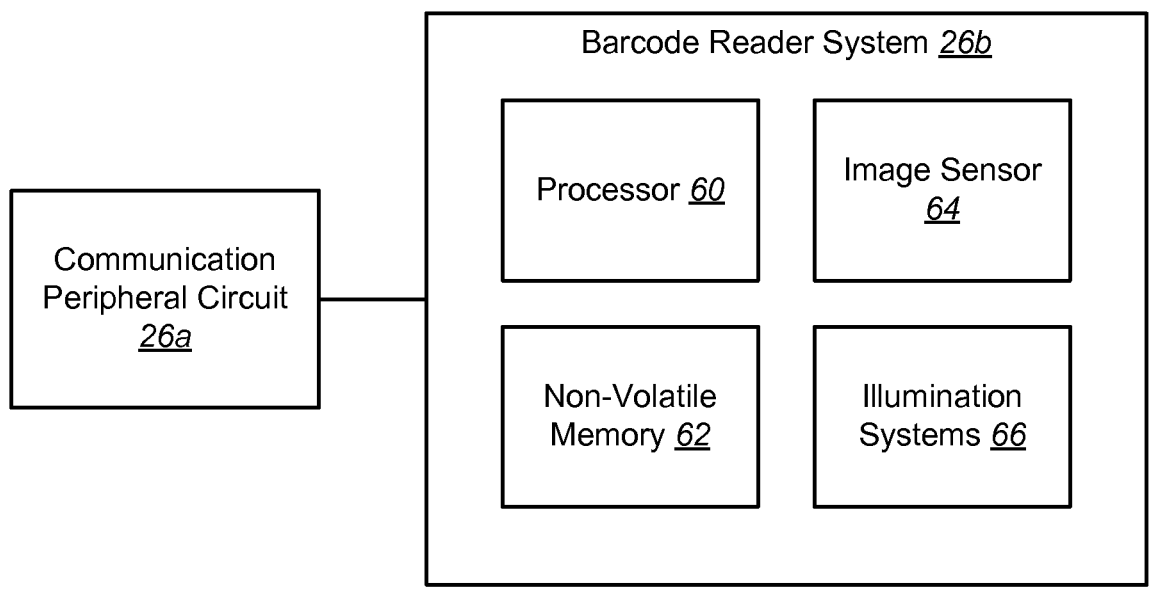
FIG. 4 is a block diagram depicting a barcode reading system of the portable computing device 10 implemented as a peripheral which communicates with the portable computing device processor via a communication peripheral circuit.

The peripheral devices 26 may be hardware circuits directly operated under control of the processor 18 or, as depicted in FIG. 4, may be a combination of hardware circuits directly operated under control of the processor 18 (such as communication peripheral circuit 26a) and a functional module such as barcode reader system 26b coupled to the communication peripheral circuit 26a. The peripheral circuit 26a may be, for example, a UART (Universal Asynchronous Receiver/Transmitter) circuit or a USB circuit such that the barcode reader system 26b communicates with the processor 18 via serial communication using the UART or USB circuit.

The processor 18 may be embodied as a combination of one or more microprocessors, microcontrollers, digital signal processors (DSPs), or the like and, when operating, executes instructions in the form of an operating system and/or applications stored in the non-volatile memory 24 or the volatile memory 20. The volatile memory 20 may include a random access memory (RAM). The non-volatile memory 24 may include a flash memory, an electrically erasable programmable read-only memory (EEPROM), or the like. The portable computing device 10 includes a battery pack 12. The battery pack 12 provides operating power to the portable computing device 10. The battery pack 12 is removable from the portable computing device 10 and may be replaceable and rechargeable. Alternatively, the battery pack 12 may be an ordinary battery that is not intended to be rechargeable. The battery pack 12 may be recharged wirelessly or through a wire connector while coupled to the portable computing device 10, or through a separate charging unit after being removed from the portable computing device 10.

Figure 2:
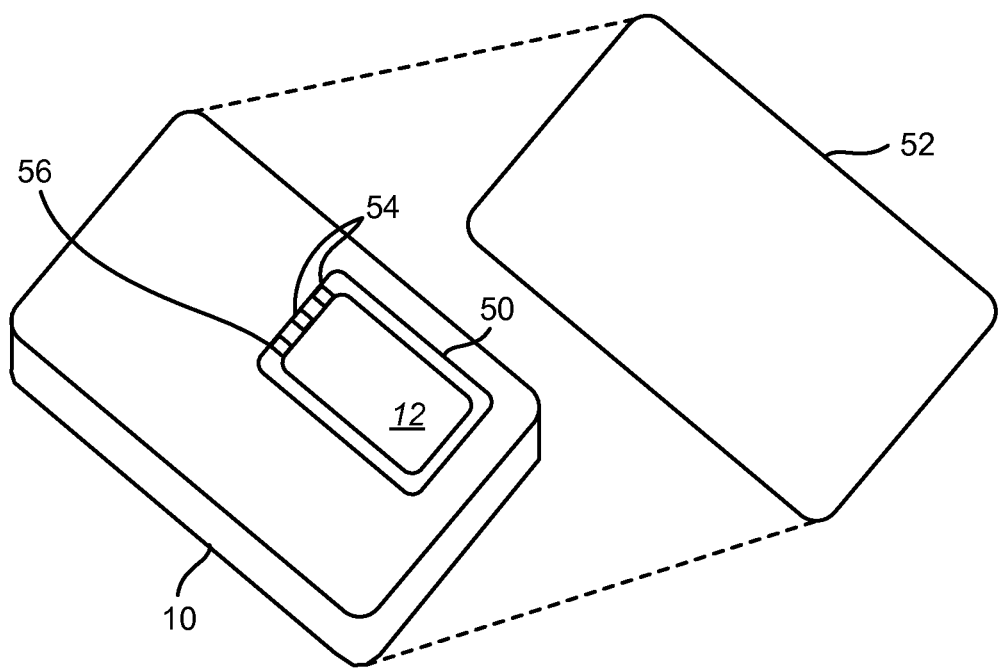
FIG. 2 shows a rear side of an exemplary portable computing device.

FIG. 2 shows a rear side of an exemplary portable computing device 10. It should be noted that the configuration of the portable computing device 10 and the battery pack 12 shown in FIG. 2 is an example, and the portable computing device 10 and the battery pack 12 may be configured differently. For example, the battery pack 12 may be a separate unit attached to the portable computing device 10. Referring to FIG. 2, the portable computing device 10 may have a rear cover 52 to cover the rear side of the portable computing device 10. The portable computing device 10 may have a mechanism that can accommodate, or engage with, the battery pack 12. For example, as shown in FIG. 2, the battery pack 12 may be inserted into a compartment 50 formed in the rear side of the portable computing device 10 and secured in the compartment 50.

The battery pack 12 has a limited capacity and should be replaced or recharged after operating the portable computing device 10 for a certain period of time. Conventionally, if the battery pack 12 is removed from the portable computing device 10 all power is lost and a re-boot is required upon reinstalling a new or recharged battery pack and powering up the portable computing device 10. The rebooting process is time-consuming and may cause an interruption of services or loss of data.

In accordance with one embodiment, the portable computing device 10 includes a battery detection circuit 14 and an internal power-supplying unit 16. The internal power-supplying unit 16 provides operating power to the portable computing device 10 temporarily when the battery pack 12 is removed from the portable computing device 10 or the battery pack 12 is depleted. The internal power-supplying unit 16 may be rechargeable and/or replaceable. The internal power-supplying unit 16 may be charged by the battery pack 12 when the battery pack 12 is coupled to the portable computing device 10. Alternatively, the internal power-supplying unit 16 may be charged by an external power source, (e.g., an AC outlet), or wirelessly.

The internal power-supplying unit 16 may be, for example, a super capacitor or an internal battery. The supercapacitor is a high-capacity electrochemical capacitor. The supercapacitor may accept and deliver charges much faster than batteries and tolerate more charging and discharging cycles than rechargeable batteries. The internal battery may be a lithium-ion battery, a Ni—Cd battery, or any type of rechargeable battery.

The battery detection circuit 14 detects removal of the battery pack 12 from the portable computing device 10. In one embodiment, the battery detection circuit 14 may detect removal of the battery pack 12 by detecting the change in position of a mechanical switch 56 that is activated upon removal of the battery pack 12. For example, the battery pack 12 may be inserted into a compartment 50 (e.g., as shown in FIG. 2) formed in the portable computing device 10, and when the battery pack 12 is removed from the compartment 50, a mechanical switch 56 may be activated to generate a signal. If the battery pack 12 is a separate external unit attached to the portable computing device 10 through a connecting mechanism, the mechanical switch 56 may be activated upon operating the connecting mechanism to detach the battery pack 12 from the portable computing device 10.

In another embodiment, the battery detection circuit 14 may detect removal of the battery pack 12 by detecting a drop in voltage across contacts at which the battery pack 12 connects to the portable computing device 10. Referring to FIG. 2, as an example, the battery pack 12 supplies power to the portable computing device through contacts 54 and the battery detection circuit 14 may detect removal of the battery pack 12 by detecting a drop in voltage across the contacts 54 when the battery pack 12 is removed from the compartment 50.

Upon detecting removal of the battery pack 12 from the portable computing device 10, the battery detection circuit 14 may generate an interrupt signal to the processor 18 such that the processor 18 may immediately begin executing a hibernation routine 22 that may be stored in the volatile memory 20 or in the non-volatile memory 24. The portable computing device 10 is configured such that the removal of the battery pack 12 does not interrupt power supply to the portable computing device 10. The internal power-supplying unit 16 can immediately provide operating power to the portable computing device 10 upon removal of the battery pack 12 such that the portable computing device 10 may not lose the system hardware context even after the battery pack 12 is removed from the portable computing device 10. After the battery pack 12 is removed, the internal power-supplying unit 16 provides operating power for the processor 18 to execute the hibernation routine 22. The capacity of the internal power-supplying unit 16 is enough to supply at least the power necessary to complete the execution of the hibernation routine 22.

Figure 3:
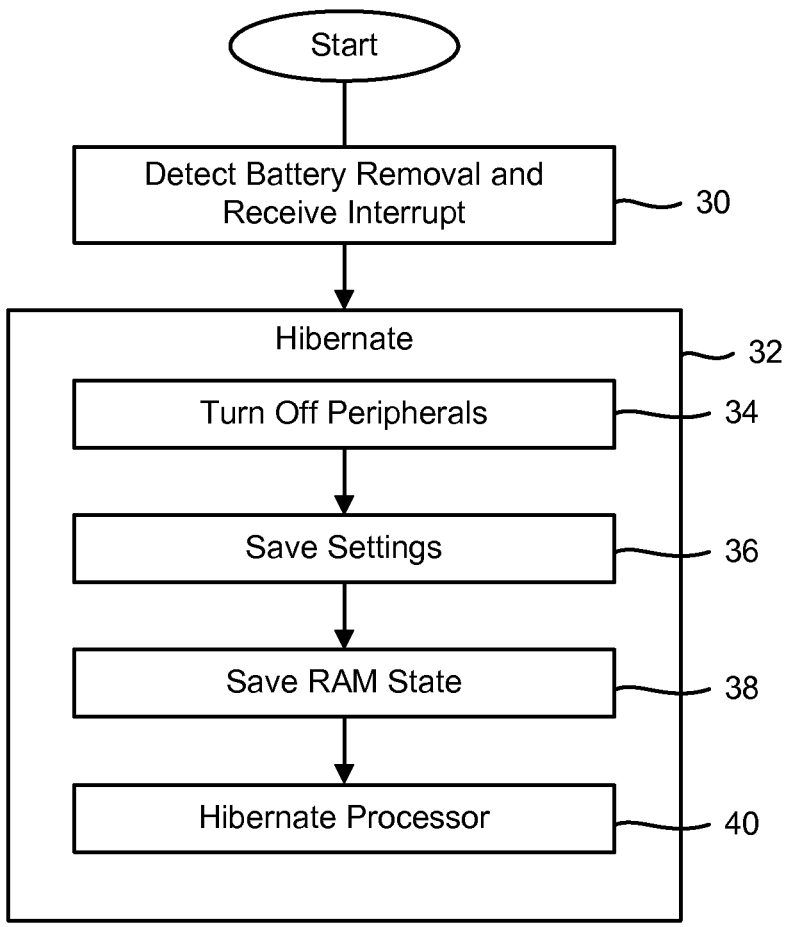
FIG. 3 is a flow diagram of a process of an exemplary operation of the processor executing the hibernation routine upon detection of removal of the battery pack from the portable computing device.

FIG. 3 is a flow diagram of a process of an exemplary operation of the processor 18 executing the hibernation routine 22 upon detection of removal of the battery pack 12 from the portable computing device 10. As disclosed above, upon removal of the battery pack 12 from the portable computing device 10, the battery detection circuit 14 detects removal of the battery pack 12, either electrically or mechanically, and generates an interrupt signal. The processor 18 receives the interrupt signal indicating removal of the battery pack 12 at step 30. The processor 18 then executes a hibernation routine at step 32.

The hibernation routine may include turning off some or all peripheral devices of the portable computing device 10 to conserve power at step 34. The peripheral devices may include local area and/or wide area network radios, a display back light, a display screen, or any other peripheral devices included in the portable computing device 10, whether the peripheral devices are operated directly by the processor 18, or the peripheral devices communicate with the processor 18 through a communication peripheral circuit (as the barcode reader system 26b does). Applications (e.g., a music player) that are not essential to the operation of the portable computing device 10 may be turned off.

The hibernation routine may include saving some or all settings of the processor 18 (e.g., the operating system context) to the non-volatile memory 24 at step 36. The state of the volatile memory 20 may be saved to the non-volatile memory 24 at step 38, which may include storing a RAM image, as it exists at the time of execution of the hibernation routine.

Turning briefly to FIG. 4, it should be appreciated that the settings of the processor 18 and the state of the non-volatile memory 62 for the processor 18 and volatile memory 20 may be saved. The barcode reading system 26b may include its own processor 60 executing code stored in a non-volatile memory 62. The barcode reader may include an image sensor 64 and an illumination system 66. The code stored in non-volatile memory 62 may include code for driving the illumination systems and capture of an image by the image sensor 64 as well as a decoder for generating decoded data from a barcode represented in an image and code for communicating with the processor 18 via the peripheral circuit 26a. In one aspect of this invention, power is immediately disconnected from all such components of the barcode reader system 26b upon detection of the interrupt signal. On power-up the barcode reader system 26b may need to be re-booted to power up from a base state instead of being recovered of its state, like is done for the main system (i.e., for the processor 18 and volatile memory 20).

The hibernation routine may include transitioning the processor 18 to a hibernation state at step 40. The hibernation state is the lowest-powered sleeping state. Alternatively, the processor 18 may transition to a sleep state or one of different levels of sleep states that may consume lower power than a full operating state. Alternatively or additionally, the processor 18 may execute the hibernation routine when the remaining power level of the battery pack 12 goes below a predetermined threshold while operating on power of the battery pack 12.

In the hibernation state, the power of the portable computing device 10 is down while retaining its states. After hibernating, the hardware components of the portable computing device 10 may be powered down like in a regular shutdown, except for a trickle current to the power button or similar devices of the portable computing device 10. By executing the hibernation routine, data can be saved before shutting down and all running programs can be restored after power turns back on.

When a battery pack 12 is re-installed, the portable computing device 10 may be restored as it was before entering hibernation. The battery detection circuit 14 may detect the installation of the battery pack 12 and the processor 18 may automatically execute the resume operation. Alternatively, a user interaction such as pressing the power button of the portable computing device 10 may be needed before executing the resume operation. By executing the resume operation, all the stored settings of the processor 18 and/or the volatile memory 20 are restored from the non-volatile memory 24 and the processor 18 may resume its operation from where it was left off before hibernation.

In accordance with some embodiments, a non-transitory computer-readable medium is provided. The non-transitory computer-readable medium may include code for detecting removal of a battery pack from a portable computing device, code for sending an interrupt signal to a processor of the portable computing device upon detection of removal of the battery pack, and code for executing a hibernation routine in response to the interrupt signal, wherein operating power of the portable computing device is provided by an internal power-supplying unit after removal of the battery pack.

The non-transitory computer-readable medium may also include code for turning off at least one peripheral device of the portable computing device. The non-transitory computer-readable medium may also include code for saving settings of the processor to a non-volatile memory and/or saving a volatile memory state to the non-volatile memory. The non-transitory computer-readable medium may also include code for detecting a change in position of a mechanical switch that is activated upon removal of the battery pack from the portable computing device. The non-transitory computer-readable medium may also include code for detecting a drop in voltage across contacts at which the battery pack connects to the portable computing device.

One or more of the features, functions, procedures, operations, components, elements, structures, etc. described in connection with any one of the configurations described herein may be combined with one or more of the functions, procedures, operations, components, elements, structures, etc. described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes, and variations may be made in the arrangement, operation, and details of the implementations described herein without departing from the scope of the claims.

What is claimed is:

1. A portable computing device, comprising:
    a non-volatile memory;
    a processor;
    a battery pack for providing power to the portable computing device;
    a battery detection unit for detecting removal of the battery pack from the portable computing device, wherein the battery detection unit detects removal of the battery pack from the portable computing device immediately upon detecting either a change in position of a mechanical switch that is activated upon removal of the battery pack from the portable computing device or a drop in voltage across contacts at which the battery pack connects to the portable computing device when the battery pack is separated from the contacts;
    an internal power-supplying unit for providing power to the portable computing device after the battery pack is removed from the portable computing device; and
    a barcode reading system coupled to the processor, wherein the processor is configured to disconnect power from the barcode reading system upon the battery detection unit detecting removal of the battery pack from the portable computing device.

2. The portable computing device of claim 1, wherein the battery detection unit is configured to generate an interrupt signal to the processor upon detection of removal of the battery pack such that the processor begins executing a hibernation routine.

3. The portable computing device of claim 2, wherein executing the hibernation routine includes saving settings of the processor to the non-volatile memory and/or saving a volatile memory state to the non-volatile memory.

4. The portable computing device of claim 1, wherein the internal power-supplying unit is a super capacitor or an internal battery.

5. The portable computing device of claim 1, wherein the internal power-supplying unit is charged by the battery pack when the battery pack is coupled to the portable computing device.

6. The portable computing device of claim 1, wherein the portable computing device is a mobile telephone or a tablet computing device.

7. A method for operating a portable computing device, the method comprising:
  detecting removal of a battery pack from the portable computing device, wherein detecting removal of the battery pack from the portable computing device comprises detecting either a change in position of a mechanical switch that is activated upon removal of the battery pack from the portable computing device or a drop in voltage across contacts at which the battery pack connects to the portable computing device when the battery pack is separated from the contacts;
  sending an interrupt signal to a processor of the portable computing device immediately upon detection of removal of the battery pack from the portable computing device; and
  executing a hibernation routine upon the processor receiving the interrupt signal, wherein operating power of the portable computing device is provided by an internal power-supplying unit of the portable computing device after removal of the battery pack, and wherein executing the hibernation routine comprises disconnecting power from a barcode reading system that is coupled to the processor of the portable computing device.

8. The method of claim 7, wherein executing the hibernation routine includes turning off at least one peripheral device of the portable computing device.

9. The method of claim 7, wherein executing the hibernation routine includes saving settings of the processor to a non-volatile memory and/or saving a volatile memory state to the non-volatile memory.

10. The method of claim 7, wherein the internal power-supplying unit is a super capacitor or an internal battery.

11. The method of claim 7, wherein the internal power-supplying unit is charged by the battery pack when the battery pack is coupled to the portable computing device.

12. The method of claim 7, wherein the portable computing device is a mobile telephone or a tablet computing device.

13. A portable computing device, comprising:
  a battery for providing operating power for the portable computing device;
  a battery detection unit for detecting removal of the battery from the portable computing device, wherein the battery detection unit detects removal of the battery from the portable computing device upon a single detection of either a change in position of a mechanical switch that is activated upon removal of the battery from the portable computing device or a drop in voltage across contacts at which the battery connects to the portable computing device when the battery is separated from the contacts;
  a processing unit configured to execute a hibernation routine upon the battery detection unit detecting removal of the battery from the portable computing device, and wherein executing the hibernation routine comprises disconnecting power from a barcode reading system that is coupled to the processing unit; and
  an internal power-supplying unit for providing power to the portable computing device after the battery is removed from the portable computing device.

14. The portable computing device of claim 13, wherein executing the hibernation routine includes at least one of turning off at least one peripheral device of the portable computing device, saving settings of the processing unit to a non-volatile memory, saving a volatile memory state to the non-volatile memory, or transitioning the processing unit to a low-power consumption state.

15. The portable computing device of claim 13, wherein the portable computing device is a mobile phone or a tablet computing device.

16. A non-transitory computer-readable medium, comprising:
  code for detecting removal of a battery pack from a portable computing device, wherein the code detects removal of the battery pack from the portable computing device upon either a change in position of a mechanical switch that is activated upon removal of the battery pack from the portable computing device or a drop in voltage across contacts at which the battery pack connects to the portable computing device when the battery pack is separated from the contacts;
  code for sending an interrupt signal to a processor of the portable computing device upon detection of removal of the battery pack from the portable computing device; and
  code for immediately executing a hibernation routine upon the processor receiving the interrupt signal, wherein operating power of the portable computing device is provided by an internal power-supplying unit of the portable computing device after removal of the battery pack, and wherein executing the hibernation routine comprises disconnecting power from a barcode reading system that is coupled to the processor of the portable computing device.

17. The non-transitory computer-readable medium of claim 16, further comprising code for turning off at least one peripheral device of the portable computing device.

18. The non-transitory computer-readable medium of claim 16, further comprising code for saving settings of the processor to a non-volatile memory and/or saving a volatile memory state to the non-volatile memory.

19. The portable computing device of claim 2, wherein execution of the hibernation routine comprises storing a random access memory (RAM) image in the non-volatile memory.

* * * * *